United States Patent
Tsutsumi

(10) Patent No.: US 9,888,147 B2
(45) Date of Patent: Feb. 6, 2018

(54) IMAGE PROCESSING APPARATUS, ELECTRONIC FILE GENERATING METHOD, AND RECORDING MEDIUM

(71) Applicant: Konica Minolta, Inc., Chiyoda-ku, Tokyo (JP)

(72) Inventor: Takahiro Tsutsumi, Toyohashi (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/244,608

(22) Filed: Aug. 23, 2016

(65) Prior Publication Data
US 2017/0064141 A1   Mar. 2, 2017

(30) Foreign Application Priority Data
Aug. 24, 2015 (JP) .................. 2015-164839

(51) Int. Cl.
G06F 17/21 (2006.01)
G06F 3/12 (2006.01)
H04N 1/00 (2006.01)
G06K 9/00 (2006.01)
H04N 1/40 (2006.01)

(52) U.S. Cl.
CPC ..... *H04N 1/40068* (2013.01); *G06K 9/00456* (2013.01); *G06F 17/214* (2013.01); *G06K 2209/011* (2013.01); *H04N 2201/0094* (2013.01)

(58) Field of Classification Search
None
See application file for complete search history.

(56) References Cited

U.S. PATENT DOCUMENTS

| 5,625,710 A * | 4/1997 | Katsuyama .......... G06K 9/42 382/209 |
| 9,237,255 B1 * | 1/2016 | Gopalkrishnan .. H04N 1/40068 |
| 2003/0081233 A1 * | 5/2003 | Obrador .................. H04N 1/40 358/1.13 |

(Continued)

FOREIGN PATENT DOCUMENTS

| JP | 2007-318520 A | 12/2007 |
| JP | 2008-042325 A | 2/2008 |
| JP | 2010-278948 A | 12/2010 |

*Primary Examiner* — Beniyam Menberu
(74) *Attorney, Agent, or Firm* — Buchanan Ingersoll & Rooney PC

(57) ABSTRACT

An image processing apparatus includes: a text area extractor that extracts multiple text areas from image data including texts; a font size calculator that calculates the font sizes of characters in each text area; a complexity calculator that calculates the complexities of characters in each text; a necessary resolution calculator that calculates a necessary resolution for the each text area with reference to the font sizes and the complexities; a resolution determination portion that merges text areas into a layer if a difference in the necessary resolution between the text areas is equal to or less than a specified value and that determines a necessary resolution for the layer with reference to the necessary resolutions for the text areas constituting the layer; and a resolution adjustment portion that adjusts the necessary resolutions for the text areas constituting the layer to a value identical to the necessary resolution for the layer.

22 Claims, 12 Drawing Sheets

(56) References Cited

U.S. PATENT DOCUMENTS

| | | | | |
|---|---|---|---|---|
| 2006/0066619 A1* | 3/2006 | Duggan | ............... | G06T 11/203 345/467 |
| 2006/0215187 A1* | 9/2006 | Itonori | ................... | G06K 9/42 358/1.2 |
| 2008/0186396 A1* | 8/2008 | Nakajima | .............. | G06F 1/162 348/333.01 |
| 2009/0303508 A1* | 12/2009 | Tanaka | .............. | H04N 1/00795 358/1.9 |
| 2009/0310868 A1* | 12/2009 | Oota | ................... | G06T 11/203 382/199 |
| 2012/0189221 A1* | 7/2012 | Inada | ...................... | G06F 3/14 382/240 |
| 2013/0050764 A1* | 2/2013 | Zhan | ..................... | H04N 1/403 358/2.1 |
| 2016/0110140 A1* | 4/2016 | Nagai | .................. | G06F 3/1229 358/2.1 |

* cited by examiner

300dpi

15pt 膚覆襲護警 ○
15pt ABCDEFG ○

6pt 膚覆襲護警 ○
6pt ABCDEFG ○

FIG.3A

200dpi

15pt 膚覆襲護警 ○
15pt ABCDEFG ○

6pt 膚覆襲護警 ×
6pt ABCDEFG ○

FIG.3B

100dpi

15pt 膚覆襲護警 ○
15pt ABCDEFG ○

6pt 膚覆襲護警 ×
6pt ABCDEFG △

FIG.3C

50dpi

15pt 膚覆襲護警 ×
15pt ABCDEFG ○

6pt 膚覆襲護警 ×
6pt ABCDEFG ×

FIG.3D

 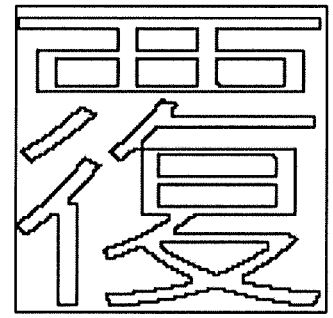
FIG.4A  FIG.4B
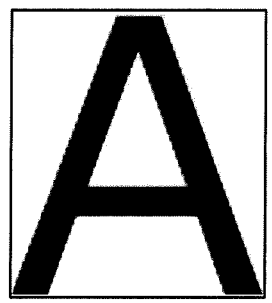 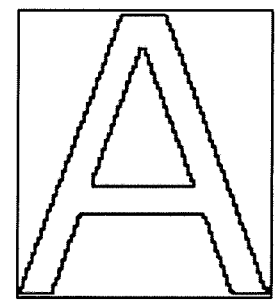
FIG.5A  FIG.5B

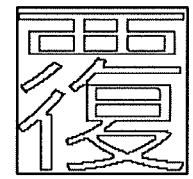
FIG.6A  FIG.6B
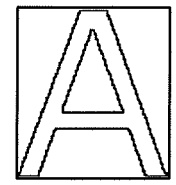
FIG.7A  FIG.7B

| Character | X: Font Size[pt] | Y: Edge Ratio[%] | X*Y |
|---|---|---|---|
| 覆 | 15 | 15.53 | 2.3295 |
| A | 15 | 7.24 | 1.086 |
| 覆 | 6 | 38.81 | 2.3286 |
| A | 6 | 17.85 | 1.071 |

| Character | X: Font Size[pt] | Y: Edge Ratio[%] | Z: Coefficient of Font Size (1/(font size)^1.25) | X*Y*Z | Necessary Resolution Obtained from the Image[dpi] |
|---|---|---|---|---|---|
| 覆 | 15 | 15.53 | 0.033875517 | 7.9 | 100 |
| A | 15 | 7.24 | 0.033875517 | 3.7 | 50 |
| 覆 | 6 | 38.81 | 0.106490517 | 24.8 | 300 |
| A | 6 | 17.85 | 0.106490517 | 11.4 | 150 |

| Font Size[pt] | Edge Ratio[%] | (1/A^1.25) | X*Y*Z | Necessary Resolution Obtained by Calculation [dpi] |
|---|---|---|---|---|
| 4 | 58.3 | 0.177 | 41.2 | 521 |
| 6 | 38.8 | 0.106 | 24.8 | 314 |
| 8 | 29.1 | 0.074 | 17.3 | 219 |
| 10 | 23.3 | 0.056 | 13.1 | 166 |
| 12 | 19.4 | 0.045 | 10.4 | 132 |
| 14 | 16.6 | 0.037 | 8.6 | 109 |
| 16 | 14.6 | 0.031 | 7.3 | 92 |
| 18 | 12.9 | 0.027 | 6.3 | 80 |
| 20 | 11.7 | 0.024 | 5.5 | 70 |

FIG.11

| Font Size[pt] | Edge Ratio[%] | (1/A^1.25) | X*Y*Z | Necessary Resolution Obtained by Calculation [dpi] |
|---|---|---|---|---|
| 4 | 27.0 | 0.177 | 19.1 | 242 |
| 6 | 18.0 | 0.106 | 11.5 | 146 |
| 8 | 13.5 | 0.074 | 8.0 | 102 |
| 10 | 10.8 | 0.056 | 6.1 | 77 |
| 12 | 9.0 | 0.045 | 4.8 | 61 |
| 14 | 7.7 | 0.037 | 4.0 | 50 |
| 16 | 6.8 | 0.031 | 3.4 | 43 |
| 18 | 6.0 | 0.027 | 2.9 | 37 |
| 20 | 5.4 | 0.024 | 2.6 | 32 |

FIG.12

IMAGE PROCESSING APPARATUS, ELECTRONIC FILE GENERATING METHOD, AND RECORDING MEDIUM

This application claims priority under 35 U.S.C. §119 to Japanese Patent Application No. 2015-164839 filed on Aug. 24, 2015, the entire disclosure of which is incorporated herein by reference in its entirety.

BACKGROUND OF THE INVENTION

Field of the Invention

The present invention relates to: an image processing apparatus such as a multifunctional digital image forming apparatus (i.e., a multi-function peripheral abbreviated as MFP) having multiple functions, e.g., copier function, printer function, facsimile function, and scanner function; an electronic file generating method for the image processing apparatus; and a recording medium.

Description of the Related Art

The following description sets forth the inventor's knowledge of related art and problems therein and should not be construed as an admission of knowledge in the prior art.

Image data including texts, for example, image data obtained from a text document by a scanner normally becomes larger in size when it is converted into an electronic file format such as joint photographic experts group (JPEG) format or portable document format (PDF).

With respect to this problem, Japanese Unexamined Patent Publications No. 2007-318520 and No. 2008-042325 disclose a technique for generating a small-size electronic file from image data including texts, which is called "compact PDF". Image data is divided into text areas and non-text areas, text areas having equal font colors are merged together to constitute one layer and converted to binary, then one color is defined in header information, which results in a reduction in the amount of text information. Meanwhile, the non-text areas are compressed after texts are removed therefrom such that they can be compressed at a higher JPEG compression ratio. With this technique, file size can be reduced accordingly.

Japanese Unexamined Patent Publication No. 2010-278948 suggests a method for adjusting the resolution to control file size within a specified value.

The technique described in Japanese Unexamined Patent Publications No. 2007-318520 and No. 2008-04232, however, has an unresolved problem as described below. Users can set the resolution low to reduce file size, but readability is negatively affected by deformation of small font-size characters and complex characters (Kanji characters, for example). Alternatively, users can set the resolution high to ensure readability, but there is a problem of increasing file size.

Without even a change in resolution, users can improve readability by a combination of various image quality adjustment processes such as background level adjustment, text sharpness level adjustment, and edge enhancement level adjustment. However, it is never easy to take trial and error with a sufficient knowledge of image processing.

Users may hope to configure the resolution settings for each page in image data depending on the page characteristics; for example, users may set the resolution low for a page including large font-size characters or alphabets characters and set the resolution high for a page including small font-size characters or Japanese characters. However, such a configuration is not commonly available.

Japanese Unexamined Patent Publication No. 2010-278948 suggests a method which does not bring a resolution to the above-described problem either. That is, with a reduction in resolution, readability is still negatively affected by deformation of small font-size characters and complex characters (Kanji characters, for example).

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to an image processing apparatus including:

a text area extractor that extracts multiple text areas from image data including texts;

a font size calculator that calculates the font sizes of characters in each text area, the each text area being extracted by the text area extractor portion;

a complexity calculator that calculates the complexities of characters in each text area, the each text area being extracted by the text area extractor portion;

a necessary resolution calculator that calculates a necessary resolution for the each text area with reference to the font sizes calculated by the font size calculator and the complexities calculated by the complexity calculator;

a resolution determination portion that merges text areas into a layer if a difference in the necessary resolution between the text areas is equal to or less than a specified value, the necessary resolution being calculated by the necessary resolution calculator, and that determines a necessary resolution for the layer with reference to the necessary resolutions for the text areas constituting the layer; and a resolution adjustment portion that adjusts the necessary resolutions for the text areas constituting the layer to a value identical to the necessary resolution for the layer, the necessary resolution being determined by the resolution determination portion.

A second aspect of the present invention relates to an electronic file generating method for an image processing apparatus, the electronic file generation method comprising:

extracting multiple text areas from image data including texts;

calculating the font sizes of characters in each text area, the each text area being extracted from the image data;

calculating the complexities of characters in each text area, the each text area being extracted from the image data;

calculating a necessary resolution for the each text area with reference to the font sizes and the complexities both being calculated;

merging text areas into a layer if a difference in the necessary resolution between the text areas is equal to or less than a specified value, the necessary resolution being calculated, and determining a necessary resolution for the layer with reference to the necessary resolutions for the text areas constituting the layer; and adjusting the necessary resolutions for the text areas constituting the layer to a value identical to the necessary resolution for the layer, the necessary resolution being determined.

A third aspect of the present invention relates to a non-transitory computer-readable recording medium storing an electronic file generating program to make a computer of an image processing apparatus execute:

extracting multiple text areas from image data including texts;

calculating the font sizes of characters in each text area, the each text area being extracted from the image data;

calculating the complexities of characters in each text area, the each text area being extracted from the image data;

calculating a necessary resolution for the each text area with reference to the font sizes and the complexities both being calculated;

merging text areas into a layer if a difference in the necessary resolution between the text areas is equal to or less than a specified value, the necessary resolution being calculated, and determining a necessary resolution for the layer with reference to the necessary resolutions for the text areas constituting the layer; and adjusting the necessary resolutions for the text areas constituting the layer to a value identical to the necessary resolution for the layer, the necessary resolution being determined.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIGS. 3A to 3D illustrate four binary text areas at four different resolutions, i.e., 300 dpi, 200 dpi, 100 dpi, and 50 dpi, for the comparison of character readability;

FIG. 4A is an explanatory view of edge ratio, illustrating a Kanji character in a font size of 15 pt; FIG. 4B is an explanatory view of edge ratio, illustrating an edge image showing edges extracted from the Kanji character;

FIG. 5A is an explanatory view of edge ratio, illustrating "A", an alphabetical character in a font size of 15 pt; FIG. 5B is an explanatory view of edge ratio, illustrating an edge image showing edges extracted from the alphabetical character;

FIG. 6A is an explanatory view of edge ratio, illustrating a Kanji character in a font size of 6 pt; FIG. 6B is an explanatory view of edge ratio, illustrating an edge image showing edges extracted from the Kanji character;

FIG. 7A is an explanatory view of edge ratio, illustrating "A", an alphabetical character in a font size of 6 pt; FIG. 7B is an explanatory view of edge ratio, illustrating an edge image showing edges extracted from the alphabetical character;

FIG. 11 is a table containing the necessary resolution obtained by calculation with regard to the Kanji character, which varies depending on the font size;

FIG. 12 is a table containing a calculated resolution obtained by calculation with regard to the alphabetical character "A", which varies depending on the font size;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described with reference to the accompanying drawings.

Figure 1:
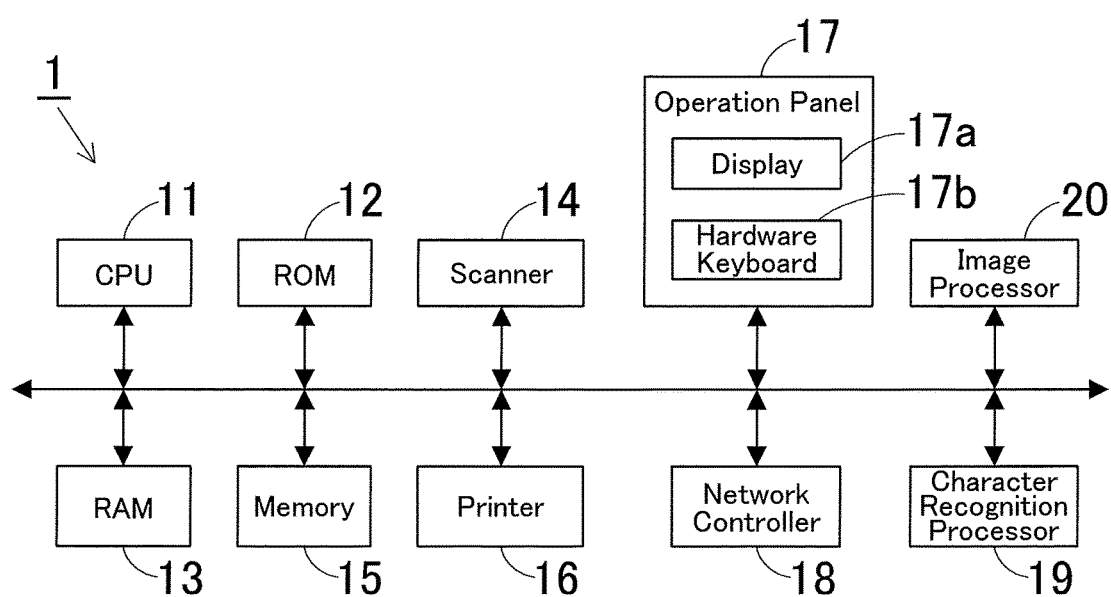
FIG. 1 is a block diagram illustrating a basic configuration of an image processing apparatus according to one embodiment of the present invention.

FIG. 1 is a block diagram illustrating a basic configuration of an image processing apparatus 1 according to one embodiment of the present invention. In this embodiment, a MFP having various functions such as a copier function, a printer function, and a scanner function as described above, constitutes the image processing apparatus 1.

The image processing apparatus 1 is essentially provided with a CPU 11, a ROM 12, a RAM 13, a scanner 14, a memory 15, a printer 16, an operation panel 17, a network controller 18, a character recognition processor 19, and an image processor 20.

The CPU 11 controls the image processing apparatus 1 in a unified and systematic manner such that users can use basic functions of the image processing apparatus 1 such as copier function, printer function, scanner function, and facsimile function. The CPU 11 allows the character recognition processor 19 to perform character recognition on image data obtained from a document by the scanner 14, which includes texts. The CPU 11 allows the image processor 20 to extract text areas, i.e., areas of text strings, obtain the font sizes and complexities of characters in each text area, and determine a necessary resolution for each character. Further descriptions of these operations will be later provided.

The ROM 12 is a memory that stores operation programs for the CPU 11 and other data.

The RAM 13 provides a workspace for the CPU 11 to operate in accordance with an operation program.

The scanner 14 is an image reader that reads an image of a document put on a platen (not shown in this figure) and converts it to image data, i.e., electronic data.

The memory 15 is comprised of a non-volatile memory device such as a hard disk drive (HDD). The memory 15 stores image data obtained from a document by the scanner 14, electronic files obtained as a result of adjusting the resolution of the image data, data received from other image processing apparatuses and user terminals, various applications, and other data.

The printer 16 prints image data obtained from a document by the scanner 14, electronic files generated from the image data, print data received from user terminals, and other data, in specified print modes.

The operation panel 17 is used for user inputs and other manipulations. The operation panel 17 is provided with: a display 17a that is comprised of a touch-screen liquid-crystal display for displaying messages, operation screens, and other information; and a hardware keyboard 17b having numeric keys, a start key, a stop key, and other keys.

The network controller 18 maintains data transmission and receipt by controlling communication with external apparatuses on the network such as other image processing apparatuses and user terminals.

The character recognition processor 19 converts a text image into text-formatted data by performing character recognition (OCR) on image data obtained from a document by the scanner 14. The character recognition processor 19 constitutes one of the functions of the CPU 11.

The image processor 20 extract text areas from image data obtained from a document by the scanner 14, which includes texts.

Figure 2:
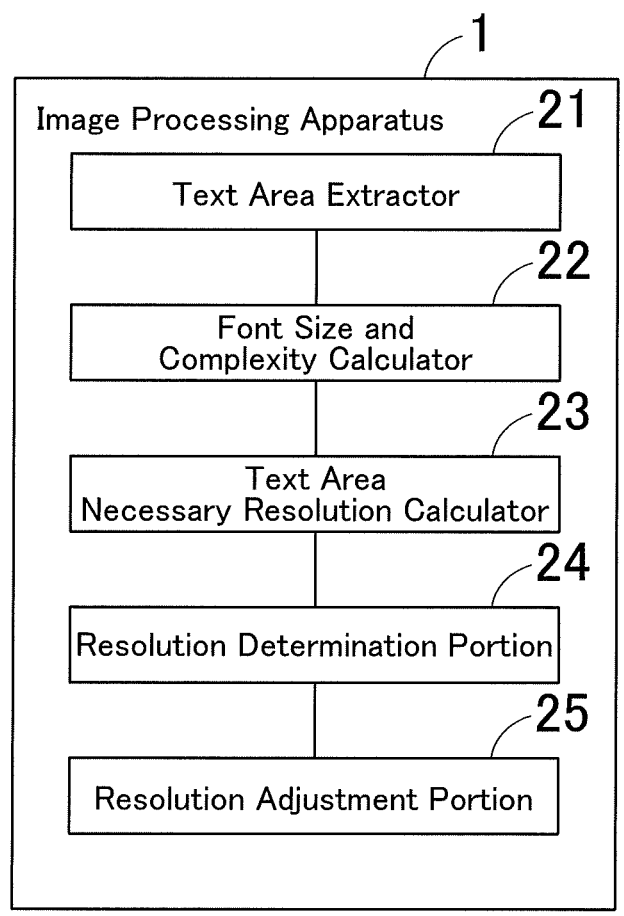
FIG. 2 is a block diagram illustrating a functional configuration of a CPU of the image processing apparatus.

FIG. 2 is a block diagram illustrating a functional configuration of the CPU 11 of the image processing apparatus 1. The CPU is essentially comprised of a text area extractor 21, a font size and complexity calculator 22, a text area necessary resolution calculator 23, a resolution determination portion 24, and a resolution adjustment portion 25.

The text area extractor 21 extracts text areas in multiple groups from text areas by a publicly known method. For example, when a text string in one line includes no space, the text area extractor 21 recognizes the text string as one text area. When multiple text strings in one line have a space between them, the text area extractor 21 recognizes the multiple text strings as multiple text areas. When text strings in one line have different font colors, the text area extractor 21 recognizes the text strings as different text areas.

The font size and complexity calculator 22 calculates the font sizes and complexities of characters in each text area extracted by the text area extractor 21. The method of calculating font size will not be described because it is broadly known. Character complexity will be later described in details.

The text area necessary resolution calculator 23 calculates a necessary resolution for each text area with reference to the font sizes and complexities of characters in the each text area, which are calculated by the font size and complexity calculator 22.

Hereinafter, character complexity and a necessary resolution for a text area will be described.

FIGS. 3A to 3D illustrate four binary text strings at four different resolutions, i.e., 300 dpi, 200 dpi, 100 dpi, and 50 dpi, for the comparison of readability.

In these figures, each text string has its font size on the left. Specifically, the first text string has Kanji characters in a font size of 15 pt, the second text string has alphabetical characters in a font size of 15 pt, the third text string has Kanji characters in a font size of 6 pt, and the fourth text string has alphabetical characters in a font size of 6 pt. In these figures, each text string has a symbol indicating its readability on the right; a circle indicates "readable", a triangle indicates "partially deformed/interrupted", and a cross mark indicates "unreadable".

The Kanji characters in a font size of 15 pt are "readable" at resolutions of 300 dpi, 200 dpi, and 100 dpi, but they are "unreadable" at a resolution of 50 dpi.

The alphabetical characters in a font size of 15 pt are "readable" at resolutions of 300 dpi, 200 dpi, and 100 dpi, and 50 dpi.

The Kanji characters in a font size of 6 pt are "readable" at a resolution of 300 dpi, but they are "unreadable" at resolutions of 200 dpi, 100 dpi, and 50 dpi.

The alphabetical characters in a font size of 6 pt are "readable" at resolutions of 300 dpi and 200 dpi, but they are "partially deformed or interrupted" at a resolution of 100 dpi. They are "unreadable" at a resolution of 50 dpi.

As is understood from the comparison in FIG. 3, with a reduction in resolution, readability is negatively affected by (1) small font-size characters and (2) complex characters (Kanji characters have higher complexities than those of alphabetical characters). This means, a resolution that ensures a lowest acceptable level of readability can be obtained with reference to two indexes, i.e., font size and character complexity.

The font size of a character or text is the horizontal and vertical size of the same, and it can be obtained by a well-known method. It is a common concept that the more edge area or branch points a character has, the more complex it is. So, in this embodiment, the complexity of a character is the edge ratio of the character or the number of branch points in the character.

FIG. 4 is an explanatory view of edge ratio. FIG. 4A illustrates a Kanji character in a font size of 15 pt, and FIG. 4B illustrates an edge image showing edges extracted from the Kanji character. The edge ratio of a character is the ratio of pixels in edge areas of the character, and is defined by the number of pixels in edge areas of circumscribed rectangles constituting the character, divided by the number of pixels in circumscribed rectangles constituting the character. The edge ratio of the Kanji character is 15.53% accordingly. The resolution that ensures a lowest acceptable level of readability is 100 dpi.

FIG. 5 is an explanatory view of edge ratio. FIG. 5A illustrates "A", an alphabetical character in a font size of 15 pt, and FIG. 5B illustrates an edge image showing edges extracted from the alphabetical character. The edge ratio is 7.24%, and the resolution that ensures a lowest acceptable level of readability is 50 dpi.

FIG. 6 is an explanatory view of edge ratio. FIG. 6A illustrates a Kanji character in a font size of 6 pt, and FIG. 6B illustrates an edge image showing edges extracted from the Kanji character. The edge ratio is 38.81%, and the resolution that ensures a lowest acceptable level of readability is 300 dpi.

FIG. 7 is an explanatory view of edge ratio. FIG. 7A illustrates "A", an alphabetical character in a font size of 6 pt, and FIG. 7B illustrates an edge image showing edges extracted from the alphabetical character. The edge ratio is 17.85%, and the resolution that ensures a lowest acceptable level of readability is 150 dpi.

With reference to the information in FIGS. 4 to 7, necessary resolutions that ensure the readability of the Kanji character and the alphabetical character "A" are obtained by calculation, which will be further described below.

Figures 8, 9, 10:
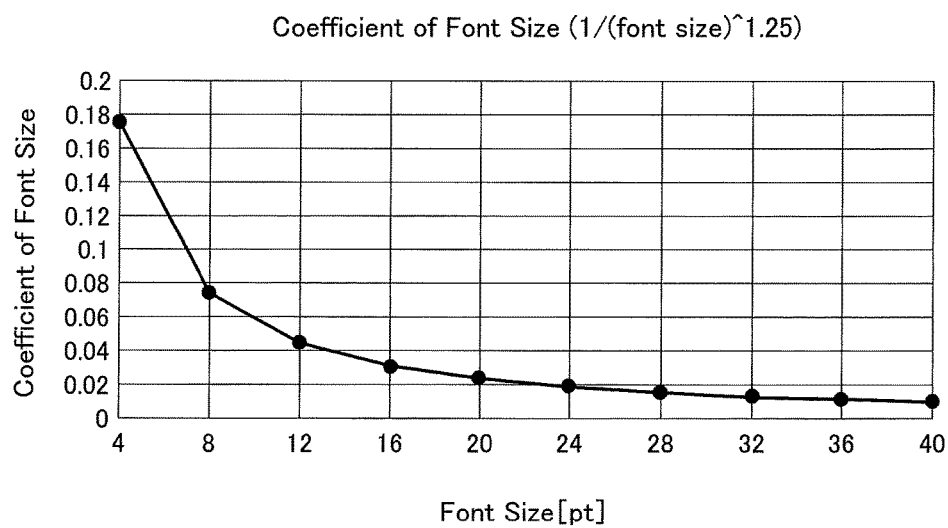
FIG. 8 is a table containing the product of font size and edge ratio with regard to the Kanji character and the alphabetical character "A"
FIG. 9 is a graph showing 1/(font size)^1.25.
FIG. 10 is a table containing the product of font size, edge ratio, and coefficient of font size based on the graph of FIG. 9, with regard to the Kanji character and the alphabetical character "A"

FIG. 8 is a table containing the value of X*Y, i.e., the product of font size (X) and edge ratio (Y) with regard to the Kanji character and the alphabetical character "A".

As is obvious from FIG. 8, the product of font size and edge ratio is approximately equal to the other product of font size and edge ratio with regard to each character. That is, font size and edge ratio are inversely proportional. Since necessary resolution varies depending on font size, a coefficient for obtaining a target necessary resolution needs to be defined.

For example, such a coefficient is defined by 1/(font size)^1.25, which is derived from experiments.

FIG. 9 is a graph showing 1/(font size)^1.25. As is obvious from the graph of FIG. 9, necessary resolution is high with small font sizes, but significantly falls with increase in font size.

FIG. 10 is a table containing the value of X*Y*Z, i.e., the product of font size (X), edge ratio (Y), and coefficient of font size (Z) based on the graph of FIG. 9 with regard to the Kanji character and the alphabetical character "A". The table of FIG. 10 further contains the necessary resolution obtained from the image.

Referring to the table of FIG. 10, with regard to the Kanji character in a font size of 15 pt, the value of X*Y*Z is estimated at 1 when the character requires a resolution of 100 dpi. With regard to the other characters, the values of X*Y*Z will be estimated as shown below when the characters require the following resolutions:

1: 100 dpi, the Kanji character in a font size of 15 pt
0.47: 47 dpi, the alphabetical character "A" in a font size of 15 pt
3.14: 314 dpi, the Kanji character in a font size of 6 pt
1.44: 144 dpi, the alphabetical character "A" in a font size of 6 pt As is obvious, the necessary resolution obtained by calculation is approximately equal to the necessary resolution obtained from the image.

FIG. 11 is a table containing the necessary resolution obtained by calculation with regard to the Kanji character, which varies depending on the font size, and FIG. 12 is a table containing the necessary resolution obtained by calculation with regard to the alphabetical character "A", which varies depending on the font size.

As is obvious from these tables, a necessary resolution that ensures readability can be obtained with reference to font size, edge ratio, and suitable coefficient.

Figure 13A:
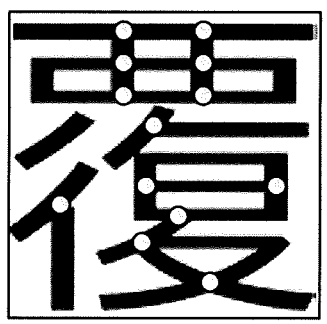
FIG. 13A illustrates an image of the Kanji character with its branch points.
Figure 13B:
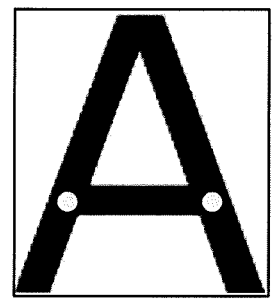
FIG. 13B illustrates an image of the alphabetical character "A" with its branch points.

As described above, character complexity may be represented by the number of branch points, instead of by edge ratio. A branch point is a contact or intersection point of lines constituting a character, from which a line extends to three or more directions. FIG. 13A illustrates an image of the Kanji character with its branch points that are indicated by open circles, and FIG. 13B illustrates an image of the alphabetical character "A" with its branch points that are indicated by open circles. The Kanji character has 13 branch points, and the alphabetical character "A" has two branch points.

It is a common concept that the more edge area or branch points a character has, the more complex it is. So, a necessary resolution that ensures a lowest acceptable level of readability can be obtained by calculation with reference to font size, the number of branch points, and suitable coefficient in a manner similar to the way it is obtained with reference to font size, edge ratio, and suitable coefficient as described above.

After calculating necessary resolutions for characters in each text area, the text area necessary resolution calculator 23 shown in FIG. 2 further calculates a necessary resolution for the each text area. In this embodiment, after a necessary resolution for a representative character of a text area, such as a first character in a text string of the text area, is calculated, it may be selected as a necessary resolution for the text area. Alternatively, after necessary resolutions for characters in each text area are calculated, the highest necessary resolution among the characters or an average of the necessary resolutions for the characters may be selected as a necessary resolution for the each text area.

If a text area has text strings in different font sizes, it may be configured such that these text strings are divided to different text areas and necessary resolutions for these text areas are further calculated. If a text area has characters having relatively high or low edge ratios, it may be configured such that these characters are separated to an independent text area and a necessary resolution for the independent text area is further calculated. For example, this corresponds to the case where a text string partially includes complex characters; in this case, the text string is divided to two or more text strings in such a manner that the complex characters are separated from the text string to constitute one or more independent text strings.

The necessary resolution for each text area may be adjusted in accordance with a specified output preference for file printing, such as a specified document mode or text quality mode. For example, if the document mode is set to text mode, not to graphic mode, or if the text quality mode is set to high by a user, the necessary resolution for each text area may be adjusted to a value higher than the necessary resolutions for the characters in the each text area, which are calculated using the font sizes and complexities of the characters.

After the text area necessary resolution calculator 23 calculates necessary resolutions for all text areas, the resolution determination portion 24 merges text areas requiring approximately equal resolutions into one group. In other words, the resolution determination portion 24 merges text areas into one layer if a difference in the necessary resolution between the text areas is equal to or less than a specified value.

Text areas having a long distance in space between them, i.e., a shortest distance between themselves, have a large overlap with each other. If such text areas are merged into a layer, it will take a long time to complete rasterization on the file to be printed, because of the overlap. To avoid this problem, text areas may be merged into one layer if the following values are equal to or less than the respective specified values: a difference in the necessary resolution between the text areas and a distance in space between the text areas. In the case where both of the following values are used for judging whether or not to merge text areas into one layer: a difference in the necessary resolution between the text areas and a distance in space between the text areas, it is preferred that the specified value for the judgment on a difference in the necessary resolution between the text areas be lowered with the increasing distance in space between the text areas. In other words, it is preferred that the condition for merging of the text areas be tightened with the increasing distance in space between the text areas. By preventing text areas having a long distance in space between them from being merged into one layer, the total number of layers can be optimally controlled.

To generate a color electronic file in a manner similar to the way a compact PDF is generated, all characters in one layer must have equal font colors. To meet this condition, text areas may be merged into one layer if both of the following values are equal to or less than the respective specified values: a difference in the necessary resolution between the text areas and a distance in font color space between the text areas. Alternatively, text areas may be merged into one layer if all the following values are equal to or less than the respective specified values: a difference in the necessary resolution between the text areas, a distance in space between the text areas, and a distance in font color space between the text areas. In the case where the following values are used for judging whether or not to merge text areas into one layer: a difference in the necessary resolution between the text areas and a distance in font color space between the text areas, it is preferred that the specified value for the judgment on a difference in the necessary resolution between the text areas be lowered with the increasing distance in font color space between the text areas. In other words, it is preferred that the condition for merging of the text areas be tightened with the increasing distance in font color space between the text areas. By preventing text areas having not approximately equal font colors from being merged into one layer, the total number of layers can be optimally controlled.

In the above-described manner, multiple text areas are divided into groups, and text areas in each group are merged together to constitute one layer. Furthermore, in this embodiment, it is judged whether or not the number of groups, i.e., the number of layers is greater than a predetermined threshold, and if it is greater than a predetermined threshold, more text areas are generated in one group by raising the specified value for the judgment on a difference in the necessary resolution between the text areas. In this manner, the total number of layers is optimally controlled, resulting in elimination of a problem of increasing file size.

In the case where the following values are used for judging whether or not to merge text areas into one layer: a difference in the necessary resolution between the text areas and either or both of a distance in space between the text areas and a distance in font color space between the text areas, if the number of layers is greater than a predetermined threshold, more text areas may be generated in one group by raising either or both of the following values: a distance in space between the text areas and a distance in font color space between the text areas.

After multiple text areas in each group are merged together to constitute one layer, the resolution determination portion 24 determines a necessary resolution for each layer. To ensure readability, it is preferred that the highest necessary resolution among the text areas in the each layer be selected as a necessary resolution for the each layer. Alternatively, however, an average of the necessary resolutions for the text areas in the each layer may be selected as a necessary resolution for the each layer.

The resolution adjustment portion 25 adjusts the necessary resolutions for the text areas in the each layer to a value identical to the necessary resolution for the each layer, which is determined by the resolution determination portion 24.

Figure 14:
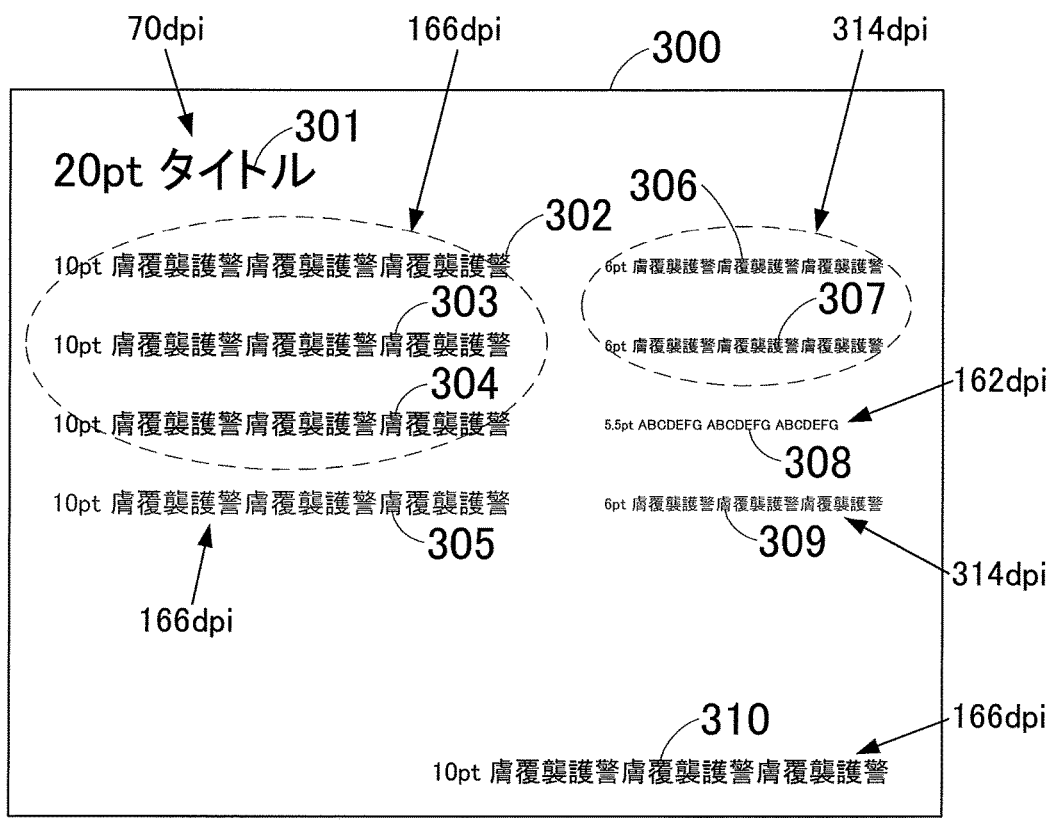
FIG. 14 illustrates an example of a document having text strings.

The following operations will be further described in details with reference to FIG. 14 which illustrates an example of a document having text strings: merging text areas in each group into one layer, determining a necessary resolution for each layer, and adjusting the necessary resolutions for the text areas.

A document 300 in FIG. 14 is read by the scanner 14, character recognition is performed by the character recognition processor 19, and text areas 301 to 310 are extracted by the text area extractor 21. In this figure, each text area has its font size on the left. The text area 301 has characters in a font size of 20 pt, the text areas 302 to 305 have characters in a font size of 10 pt, the text areas 306 and 307 have characters in a font size of 6 pt, and the text areas 308 has characters in a font size of 5.5 pt. The text areas 305 and 309 have characters in a red font color, and the other text areas have characters in a black font color.

In FIG. 14, the necessary resolutions for the text areas 301 to 310, which are calculated by the text area necessary resolution calculator 23, are also indicated. The text area 301 requires a resolution of 70 dpi, the text areas 302 to 305 and 310 require a resolution of 166 dpi, the text areas 306, 307, and 309 require a resolution of 314 dpi, and the text area 308 requires a resolution of 112 dpi.

Figure 15:
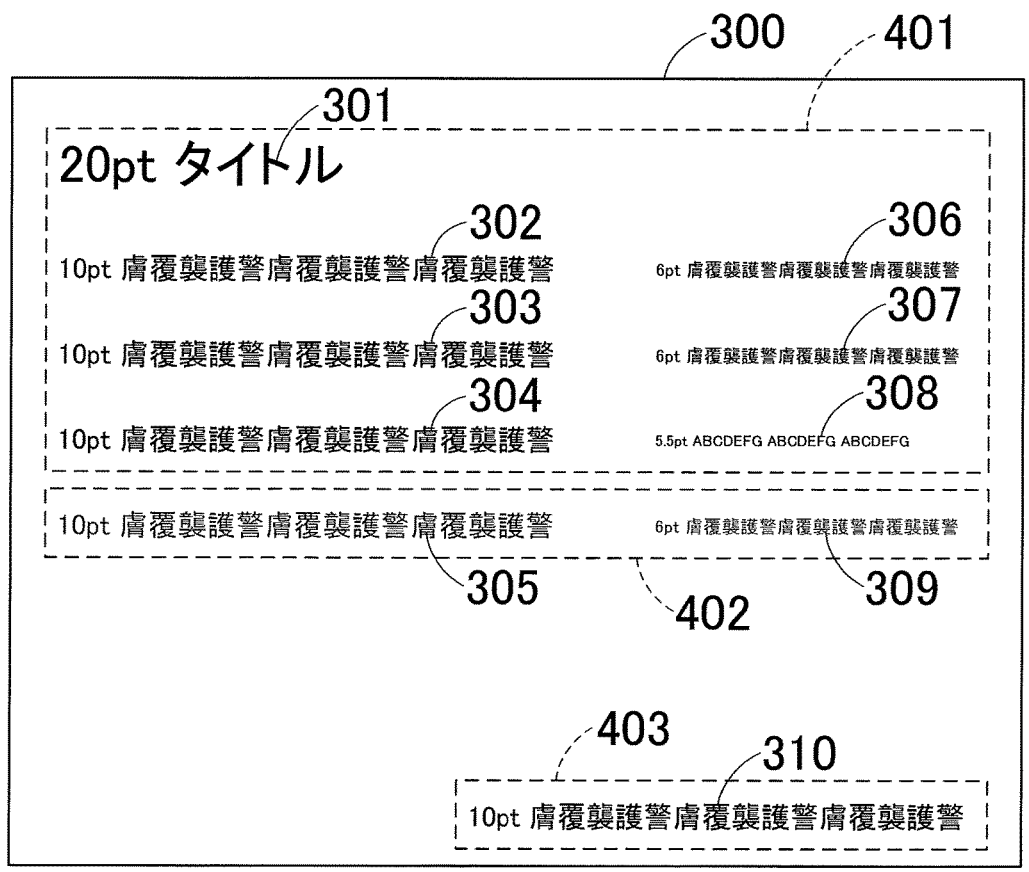
FIG. 15 illustrates multiple text areas divided in groups in the conventional method of generating a compact PDF file.

In the conventional method of generating a compact PDF file, the following values are used for judging whether or not to merge text areas into one layer: a distance in space between the text areas and a distance in font color space between the text areas. As illustrated in FIG. 15, the text areas 301 to 304 and 306 to 308 belong to a group 401 because they have a short distance in space between them and have characters in a black font color. The text areas 305 and 309 belong to a group 402 because they have a short distance in space between them and have characters in a red font color. The text area 310 belongs to a group 403. The text areas in the group 401 are merged into a layer of a black font color, the text areas in the group 403 are merged into another layer of a black font color, and the text areas in the group 402 are merged into a layer of a red font color. After that, the necessary resolutions for all the text areas are adjusted to a resolution of 200 or 300 dpi, then all the text areas are converted to binary.

Figure 16:
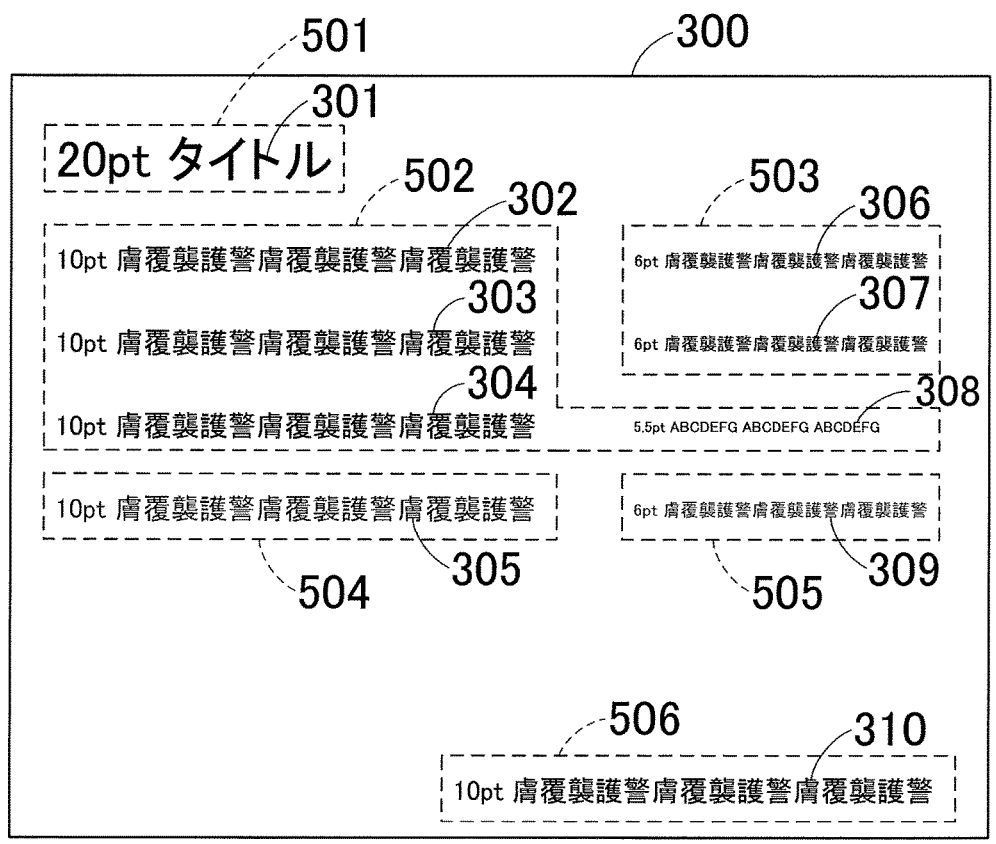
FIG. 16 illustrates multiple text areas divided in groups in the method of generating a compact PDF file according to one embodiment of the present invention.

In contrast, in this embodiment, text areas requiring equal or approximately equal resolutions are merged into one layer. It is still preferred that the following values be used for judging whether or not to merge text areas into one layer: a distance in space between the text areas and a distance in font color space between the text areas. Accordingly, as illustrated in FIG. 16, the text area 301 belongs to a group 501, the text areas 302 to 304 and 308 belong to a group 502, the text areas 306 and 307 belong to a group 503, the text area 305 belongs to a group 504, the text area 309 belongs to a group 505, and the text area 310 belongs to a group 506.

As for the group 502, the text areas 302 to 304 having characters in a font size of 10 pt and the text area 308 having characters in a font size of 5.5 pt belong to the group 502 because they require a resolution of 166 dpi and a resolution of 162 dpi which are approximately equal.

Text areas in each group are merged into one layer in the above-described manner. After that, the necessary resolutions for the text areas in the each layer are adjusted to a value identical to the necessary resolution for the each layer, then the text areas in the each layer are converted to binary. In this embodiment, the layer of the group 501 requires a resolution of 70 dpi, the layer of the group 502 requires a resolution of 166 dpi, the layer of the group 503 requires a resolution of 314 dpi, the layer of the group 504 requires a resolution of 166 dpi, the layer of the group 505 requires a resolution of 314 dpi, and the layer of the group 506 requires a resolution of 166 dpi.

Accordingly, a compact PDF file can be automatically generated while the resolutions of all text areas are optimally controlled.

As described above, in this embodiment, necessary resolutions for the text areas 301 to 310 are determined with reference to the font sizes and complexities of characters therein. That is, necessary resolutions that ensure readability are determined regardless of small font-size characters or complex characters. The characters in the layers 501 to 506 are converted at the necessary resolutions that ensure readability, which prevents deformation of small font-size characters and complex characters. An electronic file having a sufficient readability can be automatically generated accordingly.

Furthermore, text areas requiring approximately equal resolutions are merged into one layer, resulting in elimination of a problem of increasing electronic file size.

Figure 17:
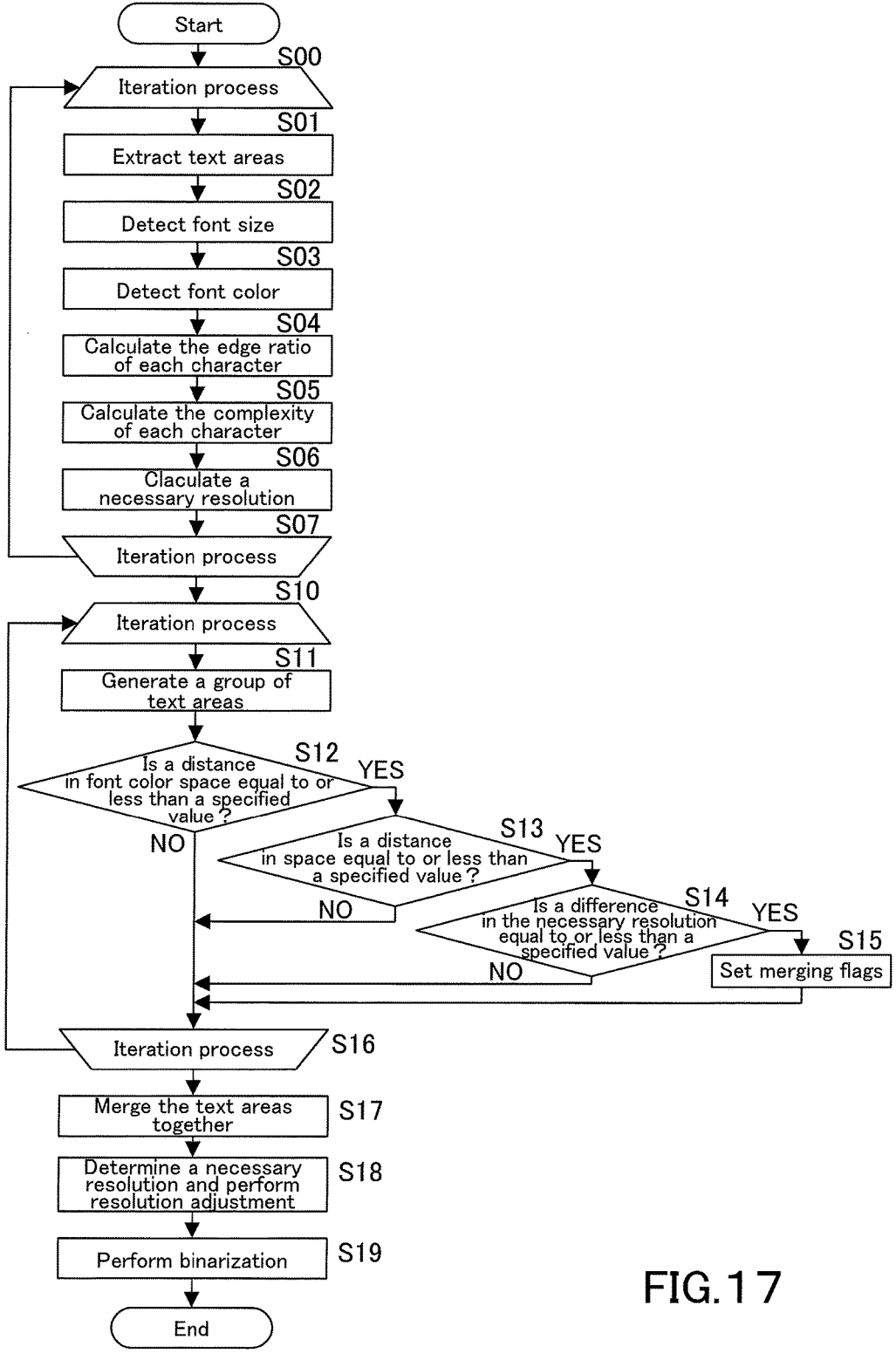
FIG. 17 is a flowchart representing operations of the image processing apparatus.

FIG. 17 is a flowchart representing operations of the image processing apparatus 1. The flowchart is executed by the CPU 11 of the image processing apparatus 1 in accordance with an operation program stored on a recording medium such as the ROM 12.

In Step S01, a first text area is extracted from image data obtained by scanning a document. In Step S02, a font size is detected from the first text area. In Step S03, a font color is detected from the first text area. The edge ratio of each character is calculated in Step S04, and the complexity of each character is calculated in Step S05. In Step S06, a necessary resolution for the first text area is calculated.

The flowchart repeats Steps S01 to S06 until completion of the calculation of necessary resolutions for all text areas (Steps S00 and S07).

In Step S11, a combination (group) of text areas is generated. Specifically, in Step S12, it is judged whether or not a distance in font color space between a first text area and a second text area is equal to or less than a specified value. If it is not equal to or less than a specified value (NO in Step S12), the flowchart proceeds to Step S16. If it is equal to or less than a specified value (YES in Step S12), it is then judged in Step S13 whether or not a distance in space between these text areas is equal to or less than a specified value. If it is not equal to or less than a specified value (NO in Step S13), the flowchart proceeds to Step S16. If it is equal to or less than a specified value (YES in Step S13), it is then judged in Step S14 whether or not a difference in the necessary resolution between these text areas is equal to or less than a specified value. If it is not equal to or less than a specified value (NO in Step S14), the flowchart proceeds to Step S16. If it is equal to or less than a specified value (YES in Step S14), merging flags that mark the same group are set on the text areas in Step S15. The flowchart then proceeds to Step S16.

The flowchart repeats Steps S11 to S15 until completion of the comparison of the first text area to all the other text areas. The flowchart further repeats Steps S11 to S15 until completion of the comparison of the second text area to all the other text areas.

In the above-described manner, a combination of text areas is generated. After that, in Step S17, text areas having identical merging flags are recognized as being of the same group and merged together to constitute one layer. In Step S18, a necessary resolution for each layer is determined, and the necessary resolutions for the text areas in the each layer are adjusted to a value identical to the determined necessary resolution. After binarization is performed in Step S19, the flowchart terminates.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
   a hardware processor that generates electronic data by being configured to:
   extract multiple text areas from image data including texts;
   calculate a font size of a character in each text area, the each text area being extracted by the hardware processor;
   calculate a complexity of a character in each text area, the each text area being extracted by the hardware processor;
   calculate a necessary resolution for the each text area with reference to the font size calculated by the hardware processor and the complexity calculated by the hardware processor;
   merge text areas into a layer if a difference in the necessary resolution between the text areas is equal to or less than a specified value, the necessary resolution being calculated by the hardware processor, and that determines a necessary resolution for the layer with reference to the necessary resolutions for the text areas constituting the layer; and
   adjust the necessary resolutions for the text areas constituting the layer to a value identical to the necessary resolution for the layer, the necessary resolution for the layer being determined by the hardware processor; and
   the electronic data is used for printing by a printing device.

2. The image processing apparatus according to claim 1, wherein the hardware processor merges text areas into a layer if either or both of the following values are equal to or less than the respective specified values: a distance in space between the text area and a distance in font color space between the text areas.

3. The image processing apparatus according to claim 2, wherein the hardware processor is further configured to judge whether or not the number of layers is greater than a predetermined threshold, the layers being obtained by the hardware processor, wherein:
the hardware processor judges that the number of the layers is greater than a predetermined threshold;
the hardware processor raises either or both of the following values: the specified value for the judgment on a distance in space between the text areas and the specified value for the judgment on a distance in font color space between the text areas; and
the hardware processor merges text areas into a layer if either or both of the following values are equal to or less than the respective specified values, the respective specified values being raised: a distance in space between the text areas and a distance in font color space between the text areas.

4. The image processing apparatus according to claim 2, wherein the specified value for the judgment on a difference in the necessary resolution between the text areas is lowered with the increasing distance in space between the text areas.

5. The image processing apparatus according to claim 2, wherein the specified value for the judgment on a difference in the necessary resolution between the text areas is lowered with the increasing distance in font color space between the text areas.

6. The image processing apparatus according to claim 1, wherein the hardware processor is further configured to judge whether or not the number of layers is greater than a predetermined threshold, the layers being obtained by the hardware processor, wherein:
the hardware processor judges that the number of the layers is greater than a predetermined threshold;
the hardware processor raises the specified value for the judgment on a difference in the necessary resolution between the text areas; and
the hardware processor merges text areas into a layer if a difference in the necessary resolution between the text areas is equal to or less than the specified value, the specified value being raised.

7. The image processing apparatus according to claim 1, wherein the complexity of a character is the edge ratio of the character.

8. The image processing apparatus according to claim 1, wherein the complexity of a character is the number of branch points in the character.

9. The image processing apparatus according to claim 1, wherein the hardware processor selects the highest necessary resolution among the text areas constituting the layer as a necessary resolution for the layer.

10. The image processing apparatus according to claim 1, wherein:
any of the text strings includes a character having a relatively high or low edge ratio, the text string being extracted from the image data; and
the hardware processor separates the character from the any text string to generate an independent text string, the character having the relatively high or low edge ratio.

11. The image processing apparatus according to claim 1, wherein the hardware processor adjusts the necessary resolution for the each text area in accordance with a specified document mode, the specified document mode being a specified output preference.

12. The image processing apparatus according to claim 1, wherein the hardware processor adjusts the necessary resolution for the each text area in accordance with a specified text quality mode, the specified text quality mode being a specified output preference.

13. The image processing apparatus according to claim 1, wherein the hardware processor is configured to:
calculate font sizes of characters in each text area, the each text area being extracted by the hardware processor;
calculate complexities of characters in each text area, the each text area being extracted by the hardware processor; and
calculate a necessary resolution for the each text area with reference to the font sizes calculated by the hardware processor and the complexities calculated by the hardware processor.

14. An electronic data generating method for an image processing apparatus, the electronic data generation method comprising:
extracting multiple text areas from image data including texts;
calculating a font size of a character in each text area, the each text area being extracted from the image data;
calculating a complexity of a character in each text area, the each text area being extracted from the image data;
calculating a necessary resolution for the each text area with reference to the font size and the complexity both being calculated;
merging text areas into a layer if a difference in the necessary resolution between the text areas is equal to or less than a specified value, the necessary resolution being calculated, and determining a necessary resolution for the layer with reference to the necessary resolutions for the text areas constituting the layer;
adjusting the necessary resolutions for the text areas constituting the layer to a value identical to the necessary resolution for the layer, the necessary resolution for the layer being determined; and
the electronic data is used for printing by a printing device.

15. The electronic data generating method according to claim 14, wherein text areas are merged into a layer if either or both of the following values are equal to or less than the respective specified values: a distance in space between the text area and a distance in font color space between the text areas.

16. The electronic data generating method according to claim 15, further comprising judging whether or not the number of layers is greater than a predetermined threshold, the layers being obtained by merging of text areas, wherein:
it is judged that the number of the layers is greater than a predetermined threshold;
either or both of the following values are raised: the specified value for the judgment on a distance in space between the text areas and the specified value for the judgment on a distance in font color space between the text areas; and
text areas are merged into a layer if either or both of the following values are equal to or less than the respective specified values, the respective specified values being raised: a distance in space between the text areas and a distance in font color space between the text areas.

17. The electronic data generating method according to claim 14, further comprising judging whether or not the number of layers is greater than a predetermined threshold, the layers being obtained by merging of text areas, wherein:
- it is judged that the number of the layers is greater than a predetermined threshold;
- the specified value for the judgment on a difference in the necessary resolution between the text areas is raised; and
- text areas are merged into a layer if a difference in the necessary resolution between the text areas is equal to or less than the specified value, the specified value being raised.

18. The electronic data generating method according to claim 14, wherein the method comprises:
- calculating font sizes of characters in each text area, the each text area being extracted from the image data;
- calculating the complexities of characters in each text area, the each text area being extracted from the image data; and
- calculating a necessary resolution for the each text area with reference to the font sizes and the complexities both being calculated.

19. A non-transitory computer-readable recording medium storing an electronic data generating program to make a computer of an image processing apparatus execute:
- extracting multiple text areas from image data including texts;
- calculating a font size of a character in each text area, the each text area being extracted from the image data;
- calculating a complexity of a character in each text area, the each text area being extracted from the image data;
- calculating a necessary resolution for the each text area with reference to the font size and the complexity both being calculated;
- merging text areas into a layer if a difference in the necessary resolution between the text areas is equal to or less than a specified value, the necessary resolution being calculated, and determining a necessary resolution for the layer with reference to the necessary resolutions for the text areas constituting the layer;
- adjusting the necessary resolutions for the text areas constituting the layer to a value identical to the necessary resolution for the layer, the necessary resolution for the layer being determined; and
- the electronic data is used for printing by a printing device.

20. The non-transitory computer-readable recording medium storing the electronic data generating program according to claim 19, wherein text areas are merged into a layer if either or both of the following values are equal to or less than the respective specified values: a distance in space between the text areas and a distance in font color space between the text areas.

21. The non-transitory computer-readable recording medium storing the electronic data generating program according to claim 20, the electronic data generating program to further make the computer execute judging whether or not the number of layers is greater than a predetermined threshold, the layers being obtained by merging of text areas, wherein:
- it is judged that the number of the layers is greater than a predetermined threshold;
- either or both of the following values are raised: the specified value for the judgment on a distance in space between the text areas and the specified value for the judgment on a distance in font color space between the text areas; and
- text areas are merged into a layer if either or both of the following values are equal to or less than the respective specified values, the respective specified values being raised: a distance in space between the text areas and a distance in font color space between the text areas.

22. The non-transitory computer-readable recording medium storing the electronic data generating program according to claim 19, the electronic data generating program to further make the computer execute judging whether or not the number of layers is greater than a predetermined threshold, the layers being obtained by merging of text areas, wherein:
- it is judged that the number of the layers is greater than a predetermined threshold;
- the specified value for the judgment on a difference in the necessary resolution between the text areas is raised; and
- text areas are merged into a layer if a difference in the necessary resolution between the text areas is equal to or less than the specified value, the specified value being raised.

* * * * *